United States Patent [19]

Arai et al.

[11] Patent Number: 5,486,567

[45] Date of Patent: Jan. 23, 1996

[54] PRIMER COMPOSITIONS

[75] Inventors: Masatoshi Arai; Yoshifumi Inoue; Toshiyuki Ozai, all of Matsuida, Japan

[73] Assignee: Shin-Etsu Chemical Co., Ltd., Tokyo, Japan

[21] Appl. No.: 389,196

[22] Filed: Feb. 15, 1995

[30] Foreign Application Priority Data

Feb. 15, 1994 [JP] Japan ........................ 6-040471

[51] Int. Cl.⁶ ..................................... C08L 83/06
[52] U.S. Cl. ................. 524/863; 524/284; 524/356; 524/379; 524/770; 524/765; 524/774; 524/858; 524/860; 524/588
[58] Field of Search ...................... 524/860, 858, 524/588, 284, 356, 379, 770, 765, 774, 863

[56] References Cited

U.S. PATENT DOCUMENTS

| | | | |
|---|---|---|---|
| 4,489,127 | 12/1984 | Gutek et al. | 428/266 |
| 4,598,134 | 7/1986 | Hirai et al. | 528/17 |
| 5,192,364 | 3/1993 | Inoue et al. | 106/287.16 |

*Primary Examiner*—Ralph H. Dean
*Attorney, Agent, or Firm*—Oblon, Spivak, McClelland, Maier & Neustadt

[57] ABSTRACT

This invention provides a primer composition comprising (A) a polyorganosiloxane resin containing at least 0.01 mole of hydroxyl groups per 100 g of the resin represented by the average composition formula: $(R^1)_a SiO_{(4-a)/2}$ wherein each $R^1$ represents a substituted or unsubstituted monovalent hydrocarbon group, and a is a value of 0.4 to 1.8; (B) an alkoxytitanium or a partially hydrolyzed product thereof; (C) an acid; and (D) a solvent. The primer composition can strongly adhere a condensation type room temperature curable silicone elastomer to the surface of the coated metal formed by applying a fluororesin coating, an acrylic resin coating or the like to a metal.

6 Claims, No Drawings

PRIMER COMPOSITIONS

BACKGROUND OF THE INVENTION

1. Field of the Invention

This invention relates to primer compositions, and more particularly to very useful primer compositions as a primer to be applied to the coated surface of adherends on which a coating film is formed by applying an acrylic resin electrodeposition-coating, a fluororesin coating or the like to various adherends, when adhering a condensation type room temperature curable silicone rubber to said adherends having the coating film.

2. Description of the Prior Art

Silicone rubbers are broadly used as construction sealants, industrial adhesive sealing materials, electrical insulating materials, and potting materials, because they are excellent in heat resistance, cold resistance, ultraviolet resistance etc. and generally have also excellent electrical properties. However, among these silicone rubbers, some condensation type room temperature curable silicone rubbers do not exhibit adhesion properties to various adherends, so that these adherends should be previously treated with a primer. Some condensation curable type silicone rubbers of another type show adhesion properties per se to various adherends but the adhesion properties are not sufficient to ensure a permanent adhesion as required for said uses, so that the treatment with a primer is also required as in the above.

As primer compositions for silicone rubbers, which are curable at room temperature by condensation, there have hitherto been known so-called silane coupling agents and their reaction products, mixtures of polyisocyanates and chlorinated rubbers, mixtures of polyester resins and acrylic resins, and mixtures of phenyl-radical containing siloxanes, alkyl silicates and chlorosilanes, and the like.

While, as outer walls for construction, there have been extensively used in recent years those having a coating film which is formed by applying a fluororesin-based coating, an acrylic resin-based coating or the like to the surface of the wall, said coatings having properties excellent in weather resistance, chemical resistance, electrical insulation, inflammability and the like. However, the condensation type room temperature curable silicone rubbers as mentioned above do not exhibit a good adhesion to such a coating film, and there occurred a problem that even if using a primer containing, as the base component, conventionally known silanes or their cohydrolytic condensation products, i.e., silicone resins, the adhesion properties can not be improved.

SUMMARY OF THE INVENTION

Accordingly, an object of the present invention is to provide a primer composition which can adhere condensation type room temperature curable silicone rubbers effectively to a coating film formed of a fluororesin-based coating, an acrylic resin-based coating or the like, when applied to the coating film.

According to this invention, there is provided a primer composition comprising the following components:

(A) a polyorganosiloxane resin containing at least 0.01 mole of hydroxyl groups per 100 g of the resin represented by the following average composition formula (I):

$$(R^1)_a SiO_{(4-a)/2} \quad (I)$$

wherein $R^1$, which may be the same or different, represent a substituted or unsubstituted monovalent hydrocarbon group, and a is a value of from 0.4 to 1.8;

(B) at least one selected from the group consisting of an alkoxytitanium and a partially hydrolyzed product thereof;

(C) an acid; and (D) a solvent.

DETAILED DESCRIPTION OF THE INVENTION

Component (A)

A polyorganosiloxane resin, the component (A), used as the base component in the primer composition of the present invention contains at least 0.01 mole, and preferably 0.04 to 0.1 mole, of hydroxyl groups per 100 g of the resin. These hydroxyl groups form adhesion active sites together with an alkoxytitanium of the component (C), said active sites contributing to adhesion to various adherends for generating the adhesion of the primer to these adherends. In case the resin containing less than 0.01 mole of hydroxyl groups is used, the adhesion active sites decreases remarkably, resulting in loss of the adhesion of the primer to various adherends.

The polyorganosiloxane resin of this invention is represented by said average composition formula (I). In this formula, the monovalent hydrocarbon groups $R^1$ include, for example, alkyl groups such as methyl, ethyl, propyl, octadecyl groups and the like; alkenyl groups such as vinyl, allyl groups and the like; aryl groups such as phenyl group and the like; and groups derived from these groups by the partial or whole substitution of the hydrogen atoms contained in these groups with halogen atoms, cyano groups and the like (for example, chloromethyl, trifluoropropyl groups etc.). Of the above groups, preferred are alkyl and aryl groups. Said polyorganosiloxane contains a plurality of $R^1$ which may be singly or in combination of two or more.

Examples of the polyorganosiloxane as above mentioned are as follows:

Compound (1): an organopolysiloxane resin consisting of $Me_3SiO_{1/2}$ units and $SiO_2$ units, with a $Me_3SiO_{1/2}/SiO_2$ ratio of 0.85, and containing 0.05 mole of silanolic hydroxyl groups per 100 g of the resin.

Compound (2): an organopolysiloxane resin consisting of $ViMe_2SiO_{1/2}$ units and $SiO_2$ units, with a $ViMe_2SiO_{1/2}/SiO_2$ ratio of 0.70, and containing 0.065 mole of silanolic hydroxyl groups per 100 g of the resin.

Compound (3): an organopolysiloxane resin consisting of $Me_3SiO_{1/2}$ units and $SiO_2$ units, with a $Me_3SiO_{1/2}/SiO_2$ ratio of 0.75, and containing 0.045 mole of silanolic hydroxyl groups per 100 g of the resin.

Compound (4): an organopolysiloxane resin consisting of $PhMe_2SiO_{1/2}$ units and $SiO_2$ units, with a $PhMe_2SiO_{1/2}/SiO_2$ ratio of 0.60, and containing 0.081 mole of silanolic hydroxyl groups per 100 g of the resin.

Compound (5): an organopolysiloxane resin consisting of $Me_3SiO_{1/2}$ units and $SiO_2$ units, with a $Me_3SiO_{1/2}/SiO_2$ ratio of 0.65, and containing 0.07 mole of silanolic hydroxyl groups per 100 g of the resin.

Compound (6): an organopolysiloxane resin consisting to $Me_3SiO_{1/2}$ units and $SiO_2$ units, with a $Me_3SiO_{1/2}/SiO_2$ ratio of 0.60, and containing 0.08 mole of silanolic hydroxyl groups per 100 g of the resin.

In the Compounds (1)–(6), Me, Vi and Ph stand for the methyl, vinyl and phenyl groups, respectively.

The polyorganosiloxane as above is contained in an amount of preferably 1 to 30% by weight, and more preferably 5 to 15% by weight, in the primer composition.

Component (B)

In the primer composition of this invention, an alkoxytitanium and a partially hydrolyzed product thereof, the component (B), contribute to the formation of adhesion active sites onto various adherends.

Such an alkoxytitanium and a partially hydrolyzed product thereof are preferably a tetraalkoxytitanium represented by the following general formula (II):

$$\text{Ti}(\text{OR}^2)_4 \qquad (II)$$

wherein a plurality of $R^2$, which may be the same or different, represent a substituted or unsubstituted monovalent hydrocarbon group, and a partially hydrolyzed product thereof. In this general formula (II), preferable monovalent hydrocarbon groups $R^2$ include an alkyl group having 2 to 5 carbon atoms. The monovalent hydrocarbon groups $R^2$ may be substituted or unsubstituted with other groups. Examples of the substiuents used herein include, for example, ethyl, n-propyl, isopropyl, n-butyl, acetoxyl and propenoxyl groups. In the present invention, preferable tetraalkoxytitaniums include tetraethoxytitanium, tetrapropoxytitanium, tetraisopropoxytitanium, tetrabutoxytitanium, and tetraacetoxytitanium.

These alkoxytitaniums and partially hydrolyzed products thereof may be used singly or in combination of two or more, and the partially hydrolyzed products may be cohydrolyzed products of at least two alkoxytitaniums.

In the present invention, the component (B) is contained in an amount of preferably 1 to 30% by weight, and more preferably 1 to 5% by weight, in the primer composition.

Component (C)

In the primer composition of this invention, the acids of the component (C) control the generation of adhesion by the components (A) and (B). Examples of the component (C) include acetic acid, hydrochloric acid, sulfuric acid, nitric acid, phosphoric acid, trifluoroacetic acid, mixtures thereof and the like. These acids are used generally after diluted with water. Among these acids, preferred are hydrochloric acid and sulfuric acid.

In this invention, the component (C) is contained in an amount of preferably 1 to 20% by weight, and more preferably 4 to 12% by weight, in the primer composition.

Component (D)

The solvents of the component (D) may be any solvent capable of dissolving each component used in the primer composition in any proportions and also having volatility. Examples thereof include, for example, aromatic hydrocarbon solvents such as benzene, toluene, xylene and the like; alcoholic solvents such as methanol, ethanol, isopropyl alcohol, butanol, ethyleneglycol monomethyl alcohol and the like; ketone solvents such as acetone, methyl ethyl ketone and the like; ester solvents such as ligroin, ethyl acetate and the like; ether solvents such as tetrahydrofuran, dioxane and the like; paraffinic solvents such as hexane, cyclohexane and the like. These solvents can be used singly or in combination of two or more.

Primer Composition

Although the primer composition can be prepared readily by mixing together uniformly each of the aforementioned components (A) to (D). In addition to these components, there may be mixed various alkoxysilanes, silane coupling agents and the like, unless the object of the present invention is injured.

The mixing of the components may be effected at room temperature, but, in general, it is desired to effect at a temperature in the range of 50° to 60° C. for about 1 to 3 hours after the components were mixed, whereby the components react with each other to form titanosiloxanes which can more increase an adhesion improving effect.

The primer composition of this invention is very useful as a primer in adhering a condensation curable type room temperature curable silicone rubber to the surface of an adherend onto which a fluororesin coating, an acrylic resin electrodeposition coating or the like has been applied. For example, by applying the primer composition to the surface of a coating film formed of fluororesin or the like, prior to application of said silicone rubber, and then curing the same rubber, the cured product of the silicone rubber composition is adhered and fixed strongly.

Thus, the primer composition of this invention is industrially very useful since by using the same, the condensation type room temperature curable silicone elastomer can be strongly adhered to the surface of a coated metal of which coating film has been formed by applying a fluororesin coating, an acrylic resin coating or the like to the metal.

EXAMPLES

Examples 1–6, Comparative Examples 1–4

As the polyorganosiloxane of the component (A), the following three polyorganosiloxane resins were used.

1) A resin of the general formula (I), where $R^1$=methyl and a=0.5 and containing hydroxyl groups in an amount of 0.065 mole per 100 g of the resin. (Compound No. (1))

2) A resin of the general formula (I) where $R^1$=methyl and a=0.6 and containing hydroxyl groups in an amount of 0.081 mole per 100 g of the resin. (Compound (4))

3) A resin of the general formula (I) where $R^1$=methyl and a=0.5, containing hydroxyl groups in an amount of 0.0021 mole per 100 g of the resin, and having a $Me_3SiO_{1/2}$ unit/$SiO_2$ unit ratio of 0.60.

According to the prescriptions shown in Tables 1 and 2, one of the polyorganosiloxane resins of said 1) to 3), tetraethoxytitanium, tetraisopropoxytitanium, γ-mercaptopropyltrimethoxysilane, tetraethoxysilane, vinyltrimethoxysilane, 36% aqueous solution of hydrochloric acid, 96% aqueous solution of sulfuric acid, ethyl acetate, and isopropyl alcohol were mixed, and the mixture was subjected to heat treatment at 50° C. for 3 hours to prepare a primer composition.

Then, two kinds of coated metal plates which were prepared by electrodepositing a fluororesin-based coating or an acrylic resin-based coating onto a metal plate, were provided as adherends. After cleaning the coated surface of each coated metal plate with toluene, each of the primer compositions obtained in such a manner as above was applied in a small thickness to the cleaned surface by means of a brush coating, followed by drying to form a primer coated film. To the primer coating surface, a condensation type room temperature curable silicone elastomer capable of releasing N,N-diethylhydroxyamine was applied and cured. After 14 days, the adhesion properties between the cured silicone elastomer and the coated metal plate was tested according to the method specified in JIS A 5758. The results are shown in Tables 3 to 4.

As seen from the above results, in case the primer compositions of Examples 1 to 6 were used, 100% elastomer failure took place with the coated metal which were coated with either a fluororesin-based coating or an acrylic resin-based coating. In contrast, where the primer compositions of Comparative Examples 1 to 4 were used, 100% interfacial failure took place with any coated metals as above.

TABLE 1

| | | \multicolumn{6}{c}{Examples} | | | | | |
|---|---|---|---|---|---|---|---|
| | | 1 | 2 | 3 | 4 | 5 | 6 |
| Polyorgano- | (1) | 10 | 10 | 10 | 0 | 0 | 0 |
| siloxane | (2) | 0 | 0 | 0 | 10 | 10 | 10 |
| resin (g) | | | | | | | |
| Ti(OEt)$_4$ (g) | | 0 | 2 | 0 | 0 | 2 | 0 |
| Ti (O-iPr)$_4$ (g) | | 2 | 0 | 2 | 2 | 0 | 2 |
| HS(CH$_2$)$_3$Si(OMe)$_3$ (g) | | 3 | 3 | 3 | 3 | 3 | 3 |
| Si(OEt)$_4$ (g) | | 2 | 2 | 2 | 2 | 2 | 2 |
| 36% aq. soln. of HCl (g) | | 1.3 | 0 | 1.3 | 1.3 | 0 | 1.3 |
| 96% aq. soln. of H$_2$SO$_4$ (g) | | 0 | 1.3 | 0 | 0 | 1.3 | 0 |
| Ethyl acetate (g) | | 0 | 100 | 0 | 0 | 100 | 0 |
| Isopropyl alcohol (g) | | 100 | 0 | 100 | 100 | 0 | 100 |

TABLE 2

| | | \multicolumn{4}{c}{Comparative Examples} | | | |
|---|---|---|---|---|---|
| | | 1 | 2 | 3 | 4 |
| Polyorgano- | (1) | 0 | 10 | 0 | 0 |
| siloxane | (2) | 0 | 0 | 10 | 0 |
| resin (g) | (3) | 0 | 0 | 0 | 10 |
| Ti(OEt)$_4$ (g) | | 2 | 0 | 0 | 0 |
| Ti(O-iPr)$_4$ (g) | | 0 | 0 | 2 | 2 |
| HS(CH$_2$)$_3$Si(OMe)$_3$ (g) | | 3 | 3 | 3 | 3 |
| CH$_2$=CHSi(OMe)$_3$ (g) | | 2 | 2 | 2 | 2 |
| 36% aq. soln. of HCl (g) | | 1.3 | 0 | 0 | 1.3 |
| 96% aq. soln. of H$_2$SO$_4$ (g) | | 0 | 1.3 | 0 | 0 |
| Ethyl acetate (g) | | 0 | 100 | 0 | 100 |
| Isopropyl alcohol (g) | | 100 | 0 | 100 | 0 |

TABLE 3

| | | \multicolumn{6}{c}{Examples} | | | | | |
|---|---|---|---|---|---|---|---|
| | | 1 | 2 | 3 | 4 | 5 | 6 |
| Fluororesin- coated metal | Elastomer failure | 100% | 100% | 100% | 100% | 100% | 100% |
| | Interfacial failure | — | — | — | — | — | — |
| Acrylic resin-coated metal | Elastomer failure | 100% | 100% | 100% | 100% | 100% | 100% |
| | Interfacial failure | — | — | — | — | — | — |

TABLE 4

| | | \multicolumn{4}{c}{Comparative Examples} | | | |
|---|---|---|---|---|---|
| | | 1 | 2 | 3 | 4 |
| Fluororesin- coated metal | Elastomer failure | — | — | — | — |
| | Interfacial failure | 100% | 100% | 100% | 100% |
| Acrylic resin-coated metal | Elastomer failure | — | — | — | — |

TABLE 4-continued

| | | \multicolumn{4}{c}{Comparative Examples} | | | |
|---|---|---|---|---|---|
| | | 1 | 2 | 3 | 4 |
| metal | Interfacial failure | 100% | 100% | 100% | 100% |

What is claimed is:

1. A primer composition comprising the following components:

(A) a polyorganosiloxane resin containing at least 0.01 mole of hydroxyl groups per 100 g of the resin represented by the following average composition formula (I):

$$(R^1)_a SiO_{(4-a)/2} \tag{I}$$

wherein $R^1$, which may be the same or different, represent a substituted or unsubstituted monovalent hydrocarbon group, and a is a value of from 0.4 to 1.8;

(B) at least one compound selected from the group consisting of an alkoxytitanium and a partially hydrolyzed product thereof;

(C) an acid; and (D) a solvent.

2. A primer composition claimed in claim 1, wherein the polyorganosiloxane of the component (A) is at least one member selected from the group consisting of:

an organopolysiloxane resin consisting of Me$_3$SiO$_{1/2}$ units and SiO$_2$ units, with a Me$_3$SiO$_{1/2}$/SiO$_2$ ratio of 0.85, and containing 0.05 mole of silanolic hydroxyl groups per 100 g of the resin, an organopolysiloxane resin consisting of $ViMe_2SiO_{1/2}$ units and $SiO_2$ units, with a $ViMe_2SiO_{1/2}/SiO_2$ ratio of 0.70, and containing 0.065 mole of silanolic hydroxyl groups per 100 g of the resin, an organopolysiloxane resin consisting of $Me_3SiO_{1/2}$ units and $SiO_2$ units, with a $Me_3SiO_{1/2}/SiO_2$ ratio of 0.75, and containing 0.045 mole of silanolic hydroxyl groups per 100 g of the resin, an organopolysiloxane resin consisting of $PhMe_2SiO_{1/2}$ units and $SiO_2$ units, with a $PhMe_2SiO_{1/2}/SiO_2$ ratio of 0.60, and containing 0.081 mole of silanolic hydroxyl groups per 100 g of the resin, an organopolysiloxane resin consisting of $Me_3SiO_{1/2}$ units and $SiO_2$ units, with a $Me_3SiO_{1/2}/SiO_2$ ratio of 0.65, and containing 0.07 mole of silanolic hydroxyl groups per 100 g of the resin, and an organopolysiloxane resin consisting of $Me_3SiO_{1/2}$ units and $SiO_2$ units, with a $Me_3SiO_{1/2}/SiO_2$ ratio of 0.60, and containing 0.08 mole of silanolic hydroxyl groups per 100 g of the resin.

3. A primer composition claimed in claim 1, wherein the component (B) is at least one compound selected from the group consisting of tetraalkoxytitaniums represented by the following general formula (II):

$$Ti(OR^2)_4 \qquad (II)$$

wherein a plurality of $R^2$, which may be the same or different, represent a substituted or unsubstituted monovalent hydrocarbon group, and a partially hydrolyzed product thereof.

4. A primer composition claimed in claim 1, wherein the acid of the component (C) is at least one acid selected from the group consisting of acetic acid, hydrochloric acid, sulfuric acid, nitric acid, phosphoric acid and trifluoroacetic acid.

5. A primer composition claimed in claim 1, wherein the solvent of the component (D) is at least one member selected from the group consisting of aromatic hydrocarbon solvents, alcoholic solvents, ketone solvents, ester solvents, ether solvents and paraffinic solvents.

6. A primer composition claimed in claim 1, wherein the components (A), (B), and (C) are contained in an amount of 1 to 30% by weight, 1 to 30% by weight, and 1 to 20% by weight in the primer composition, respectively.

* * * * *